May 9, 1950 R. C. McKENDRY 2,506,607
IMPACT TESTING MACHINE
Filed Oct. 18, 1946 2 Sheets-Sheet 1
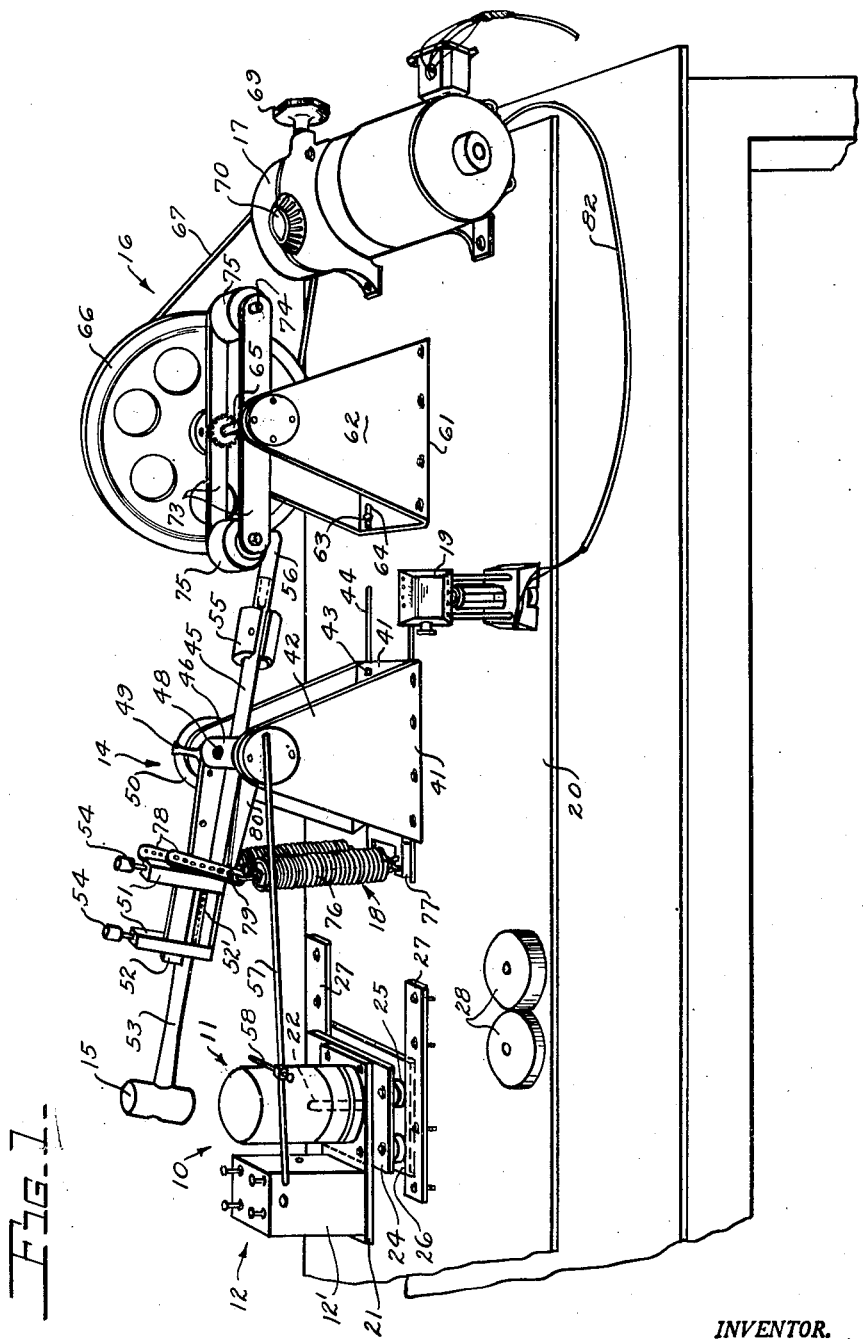
INVENTOR.
RICHARD C. McKENDRY
BY Wade Koontz AND
J. Daniel Stuwe
ATTORNEYS May 9, 1950   R. C. McKENDRY   2,506,607
IMPACT TESTING MACHINE
Filed Oct. 18, 1946   2 Sheets-Sheet 2
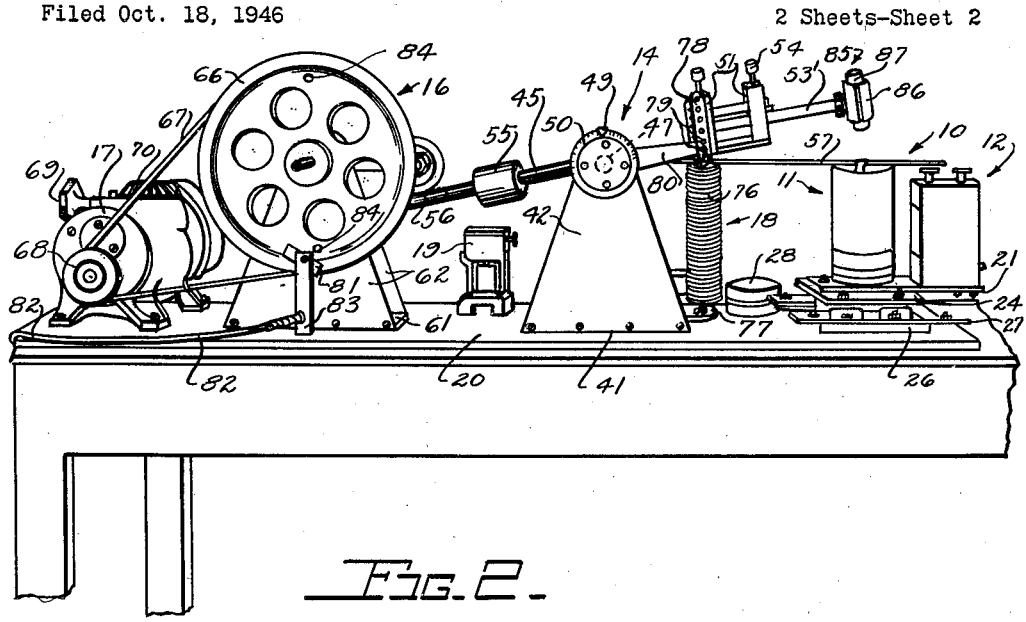
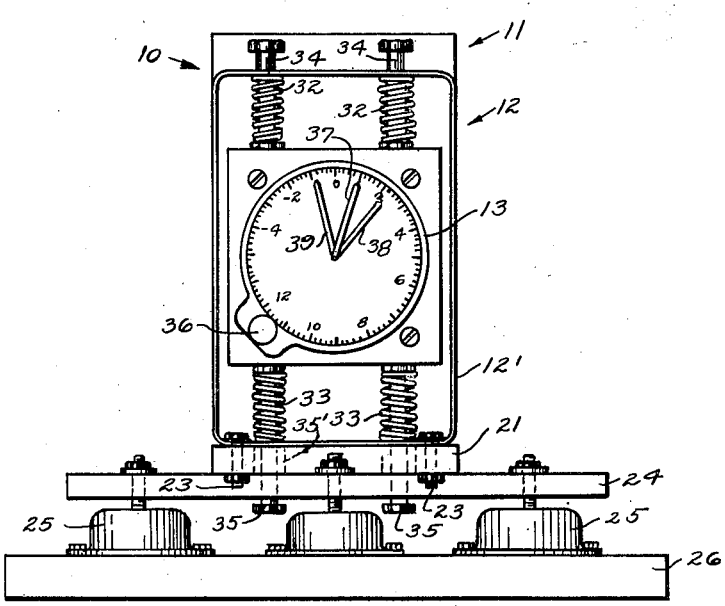
INVENTOR.
RICHARD C. McKENDRY.
BY Wade Koontz AND
J. Daniel Stuwe
ATTORNEYS Patented May 9, 1950

2,506,607

UNITED STATES PATENT OFFICE 2,506,607

IMPACT TESTING MACHINE

Richard C. McKendry, Dayton, Ohio

Application October 18, 1946, Serial No. 703,979

1 Claim. (Cl. 73—12)

(Granted under the act of March 3, 1883, as amended April 30, 1928; 370 O. G. 757)

The invention described herein may be manufactured and used by or for the Government for governmental purposes without payment to me of any royalty thereon.

This invention relates to an impact testing machine useful as a general impact tester, but more particularly adapted for testing the force of impact of hammers and similar impact specimens.

One of the essential objects of this invention is to provide an impact testing mechanism which is especially adapted for testing the force of impact of hammers or hammer heads or mallets or similar specimens to ascertain the wear, breakage, and distortion caused thereto by impact, in order to aid in accurately estimating the service life of specimens of that type.

Another object of this invention is to provide such a testing machine which is adapted and arranged so that one can first obtain the necessary impact data through direct use and trial of the hammer or other impact specimen to be tested, and can then reproduce that same force of impact by proper adjustment of this machine and the subsequent continued testing of the hammer or specimen thereon.

A more particular object of this invention is to provide such a testing machine adapted for testing hammers and similar handle-equipped articles whereby to closely simulate a mechanic's grip on the handle and to reproduce common practical conditions, instead of using arbitrary test standards, in order to closely approach a truly reliable basis for predicting the service life of any type of hammer or similar article being tested.

Another object of this invention is to provide an impact tester of this kind whereby to obtain direct readings of the impact force in foot pounds or similar units of force, and preferably to accomplish this by including in such tester an instrument built on the accelerometer principle wherein the internal calibration can be readily adjusted, so as to accommodate a considerable range in weight and size of a test article and of its force of impact.

Another object of this invention is to provide such an impact testing machine which utilizes an impact receiving anvil which itself is shock mounted, and whereon an impact indicating instrument is then adjustably and resiliently mounted and its calibration can be readily adjusted.

These and various other objects and advantages are attained with this invention as will become apparent from the following description, taken in connection with the accompanying drawings wherein the invention is shown in its preferred form, it being evident that other arrangements and forms of construction may be resorted to in carrying out the objects and purposes of this invention.

In the drawings:

Fig. 1 is a perspective view of this novel impact testing machine, as seen from one side thereof.

Fig. 2 is a side elevational view thereof, seen from the side opposite to that of Fig. 1.

Fig. 3 is an end view of the invention showing particularly the impact meter.

This invention is useful as a general impact tester, but it is more particularly adapted for testing the force of impact of hammers, mallets, and other handle-equipped articles used for striking blows. It comprises, briefly, an impact measuring assembly 10 including an impact receiving member 11, preferably in the form of a yieldably mounted anvil, and an impact indicating member 12, preferably including an outer housing 12' and a meter 13 movably mounted therein, said member 12 being connected with said member 11 and actuated thereby; and this tester further comprises an article supporting assembly 14 for carrying the test specimen or article 15 and actuating it during operation; and also an operating mechanism for actuating the supporting means with the article, this mechanism including the driving assembly 16 driven by a motor 17 for actuating the assembly 14 with its supported article 15 away from the impact member 11, thereby raising the article 15 and enabling it to descend onto said impact members. This operating mechanism preferably includes means 18 for positively retracting said supporting means and thereby move the article forcefully onto the impact member 11. An electric counter 19 is also provided to count the number of impacts of the article 15 on the member 11, all said means 10 to 19 being mounted on a supporting base or base plate 20.

The impact measuring assembly 10 includes a supporting plate 21 whereon the anvil 11 is mounted by threading it on a screw 22 arising from the plate, and on said plate is also mounted the main housing 12' of said indicating member 12 as by means of bolts 23. Said plate 21 is secured upon a plate 24 which bears on yieldable supporting means, such as shock mounts 25 which rest on a plate 26, the latter plate being adjustably secured on the base plate 20, as by means of bars 27 bearing on the ends of said plate 26 and by the use of bolts extending through said bars and plate. This provides for adjustment of the anvil and the meter laterally and also longitudinally on the base plate 20; while shims 28 are provided, which are preferably of various thickness, adapted to be mounted under the anvil, one or more at a time whereby to vary its height.

The impact indicating member 12 is preferably arranged to indicate the impact directly in foot pounds, and it thus comprises the meter 13 mounted floatingly therein, as by means of floatation springs including upper springs 32 and lower springs 33 positioned respectively between the top ends and the bottom ends of the meter casing and of the main housing 12', said springs being mounted and guided by bolts 34 and 35 threaded into nuts brazed on the top and on the bottom of the meter casing and extending through clearance holes provided in the top and in the bottom of said housing 12'.

For convenience, the meter 13 may comprise a casing containing therein a standard aircraft accelerometer which has a positive or clockwise scale reading to 12 gs., and the scale is converted directly to foot pounds. For each foot pound impact on the anvil this accelerometer records ⅓ g., and the accelerometer has a return button 36 for returning its index hands 37, 38, and 39 to zero. Said indicating member 12 can herein be readily removed bodily from the impact member 11 and from the machine by merely releasing the lower mounting bolts 23, while the screws 35 pass through oversized holes 35' in plate 21.

The shock mounts 25 may be aircraft vibration isolators of 15 pounds capacity each. These shock mounts thus partially absorb the impact of the article 15 on the anvil 11 and transfer the effect thereof to the accelerometer 13 through the floatation springs 32 and 33. The compressibility of these springs 32 and 33 is an essential factor in the calibration of the complete impact meter assembly, and these shock mounts and springs together also provide a means of calibration control.

The article supporting assembly 14 includes a support 41 and this is shown herein in the form of a plate including two triangular arms 42 arising from the main lower part thereof which is adjustably mounted on base 20, as by means of bolts 43 that are securable in the desired position in slots 44 provided in the base 20. At the upper parts of the two arms 42 is movably mounted an operating member 45 for supporting and moving the test article into contact with the anvil 11; and this member 45 is herein shown as a shaft which is longitudinally adjustable in an enlarged part 46 on an axle 47, this shaft 45 being held secured in said part by a set screw 48. The axle is rotary in said upper arm parts so as to render the shaft 45 swingable with the article carried thereby. This axle has a pointer 49 secured adjacent one end thereof, adapted to travel over a dial 50 mounted stationary on one of the arms 42, whereby to indicate the degree or arc of swinging movement of said shaft 45 with the article 15 during operation.

The invention disclosed herein is illustrated as being more particularly adapted for testing articles that are equipped with a handle, such as a hammer and the like; and the shaft 45 is therefore provided with means for grasping such a handle, this means being herein shown as including a pair of yokes 51 secured to the outer end of shaft 45 and having an upper jaw 52 and a lower jaw 52' mounted therein which are preferably of rubber or other anti-slip material and are adapted to clasp firmly therebetween the handle 53 of the article 15, and substantially in the same way as the handle is grasped by the hand during ordinary use. Set screws 54 extend through the yokes to force the jaws firmly onto the handle. A counterweight 55 is adjustably mounted on shaft 45 to substantially balance the weight of the hammer; and a brass tip 56 is mounted detachably on the end of the shaft opposite the hammer, so as to be replaceable in case of excessive wear.

An extension arm 57 is secured at one end onto an upstanding arm 42 of support 41. It extends substantially horizontally therefrom toward the anvil 11, and on the free end part of this arm is mounted a needle or pointer 58 which is adjustable longitudinally of said arm and is adapted to be used as a reference point to aid in properly positioning the anvil and other parts while being changed.

The operating assembly 16 includes a support 61 which is similar to support 41 and contains two arms 62 arising from its main lower part which is mounted adjustably on base 20, as by means of screws 63 extending from said base 20 through slots 64 provided in said lower part. A shaft 65 is rotary in the upper part of said arms, and it has a grooved wheel 66 secured on one end which is driven through a V-shaped belt 67 by means of a pulley 68 driven by said motor 17. Said motor is preferably also mounted on the base 20, and it is adjustable for speed, as by operating a hand wheel 69, the speed adjustment being indicated by a scale 70 on the motor housing.

The means provided on this assembly 16 for operating the shaft 45 comprises a pair of arms 73 secured on shaft 65 and carrying at their two ends a pair of rods 74 each having a roller 75 rotatively mounted thereon, and these rollers are so positioned as to engage the end part of tip 56 on shaft 45 and swing down said shaft end by rolling downwardly along said tip 56, while the wheel 66 with shaft 65 and arms 73 rotate.

By rotation of wheel 66 in a clockwise direction, as viewed in Fig. 2, the tip end 56 on shaft 45 is forced downward and the opposite end of said shaft with the article 15 are forced upward. When the roller 75 has rolled down from the end of said tip 56, then the other end with article 15 will be enabled to move downward to strike upon the anvil, the means 18 being provided for positively forcing said raised end of the shaft with the article downwardly onto the anvil. As shown herein, this means is conveniently provided in the form of a pair of coil springs 76 which may be mounted in any appropriate manner, and which are shown herein as each spring having its lower end secured by means 77 onto the support 41, and the upper end of each spring being secured to a bracket bar 78 which is adjustably mounted by means 79, such as a set of apertures and a pin, on the free end of an arm 80 which has its other end secured onto said enlarged part 46 of axle 47. The pair of springs 76 are herewith placed under tension by the upward movement of the hammer, and the tension of these springs can be adjusted by adjusting the two pins in the apertures in the two bracket bars 78 and thereby adjusting the force of impact of the hammer or article 15 upon the anvil during the descending operation.

In cooperation with the counter 19, a microswitch 81 is provided and it is connected with said counter by an electrical conductor 82, said switch being mounted by bracket means 83 on the base 20. A pair of pins 84 on one side of wheel 66, which pins are spaced 180° apart and timed with the actions of the two rollers 75 onto the tip 56, will operate said microswitch 81 just as the hammer strikes the anvil, and thus will record the contacts of said rollers on said tip and thereby the number of swings of the hammer and its impacts on the anvil.

The impact anvil 11 absorbs the blow of the descending hammer 15 and through deflection of the shock mounts 25 transmits the effect through the floatation springs 32 and 33 to the accelerometer 13.

This machine is adapted for testing various types of impact specimens, and in Fig. 2 is indicated a specimen 85 including a knuckle 86 on the end of the handle 53' which clamps therein a hammerhead 87 to be tested.

In utilizing this device, the anvil should be placed so that the head or impact part of the hammer or mallet or other article 15, that is to be tested, will be exactly level on the top face of the anvil 11 when the scales of the impact indicating meter 13 and of the counter 19 are placed at zero.

The average blow struck with the type of hammer or article to be tested is first determined by having a group of mechanics or hammer users, say a dozen or more, each strike several blows with a specimen of this type of hammer on this anvil. The force of each blow is read from the impact meter in foot pounds, and the average of all such blows is noted for that type and make and weight of hammer.

The machine is then adjusted, by adjusting the tension of springs 76, also the length of stroke of the hammer 15 and the position of the balance weight 55, so that said average blow so obtained is thereafter reproduced in foot pounds impact on the machine.

The handle 53 of the hammer or other article to be tested is next clamped between the rubber surfaces of the grasping means 51, 52, 52', 54, provided on the shaft 45, the handle being engaged at the part which is customarily grasped by the hand of the mechanic during use. Spring tension and stroke adjustment should be checked for obtaining the proper foot pounds impact. The initial position of the springs 76 should be substantially vertical, to cut down the rebound. The speed of the motor should be properly set to eliminate any change thereof during the extended test of the particular article. The test may be prolonged as long as desired. The descending hammer which strikes the anvil will cause the positive or clockwise hand 38 of the accelerometer to take up the position for which the indicating assembly 12 was calibrated and the machine adjusted; while the negative hand 39 of the accelerometer, although having no bearing on the impact, will take up a position to the left, according to the undampened vibration present in the machine. The speed of the motor determines the number of contacts or impacts of the rollers 75 on the tip 56 and the consequent swings of shaft 45 with the resulting impacts of the hammer on the anvil, whereof 30 to 80 impacts per minute is a reasonable range of speed, while the stroke of the shaft 45 and hammer is preferably set at approximately 35°. Such testing is continued until the resulting wear or breakage or distortion of the article will indicate the length of service life of the specimen which is being tested and thereby of other specimens of that type.

I claim:

An impact testing machine for testing handle-equipped articles of different handle lengths comprising a frame, a resilient base mounted for longitudinal adjustment on the forward end of said frame, clamping means for fixing said base in the adjusted position, an impact receiving anvil and an impact receiving and recording instrument both mounted on said resilient base, a rocking beam extending longitudinally of said frame, pivoting means adjustable longitudinally with respect to said beam situated intermediate the ends of said beam for rocking said beam, a pivot supporting stand longitudinally adjustable on said frame for carrying said pivoting means, a handle clamp carried on the forward end of said beam adjustable for grasping handles of different sizes and lengths, operating means at the rearward end of said beam, said operating means comprising a bearing stand adjustable longitudinally on said frame, an operating bar extending longitudinally of said frame rotatably supported midway of its ends on a transverse shaft having bearing in said bearing stand, rollers rotatably supported at the outer ends of said operating bar positioned to strike the rearward end of said rocking beam and force it downward as the operating bar is rotated, controllable power means adapted for rotating said operating bar on its transverse shaft, and adjustable tension spring means adapted to draw the forward end of said rocking beam downward and the handle equipped member onto said anvil when said rollers pass off the end of said rocking beam.

RICHARD C. McKENDRY.

REFERENCES CITED

The following references are of record in the file of this patent:

UNITED STATES PATENTS

| Number | Name | Date |
|---|---|---|
| 1,462,813 | McAdam | July 24, 1923 |
| 1,583,109 | Banschbach | May 4, 1926 |
| 1,604,141 | Amsler | Oct. 26, 1926 |
| 2,177,876 | Perrey | Oct. 31, 1939 |
| 2,281,324 | Preston | Apr. 28, 1942 |
| 2,396,620 | Taxwood | Mar. 12, 1946 |
| 2,398,458 | Zavarella | Apr. 16, 1947 |

FOREIGN PATENTS

| Number | Country | Date |
|---|---|---|
| 541,728 | Great Britain | Jan. 13, 1941 |